US012697661B2

(12) United States Patent
Binek et al.

(10) Patent No.: US 12,697,661 B2
(45) Date of Patent: Aug. 4, 2026

(54) MULTIPLE ADDITIVE MANUFACTURING TECHNIQUE MATERIAL DEPOSITION

(71) Applicant: RTX Corporation, Farmington, CT (US)

(72) Inventors: Lawrence Binek, Glastonbury, CT (US); Jesse Boyer, Middletown, CT (US); Joseph Ott, Enfield, CT (US)

(73) Assignee: RTX CORPORATION, Farmington, CT (US)

( * ) Notice: Subject to any disclaimer, the term of this patent is extended or adjusted under 35 U.S.C. 154(b) by 101 days.

(21) Appl. No.: 18/930,846

(22) Filed: Oct. 29, 2024

(65) Prior Publication Data

US 2026/0115798 A1     Apr. 30, 2026

(51) Int. Cl.
| | |
|---|---|
| *B22F 12/37* | (2021.01) |
| *B22F 10/25* | (2021.01) |
| *B33Y 10/00* | (2015.01) |
| *B33Y 80/00* | (2015.01) |
| *C23C 24/04* | (2006.01) |

(52) U.S. Cl.
CPC .............. *B22F 12/37* (2021.01); *B22F 10/25* (2021.01); *B22F 2301/10* (2013.01); *B33Y 10/00* (2014.12); *B33Y 80/00* (2014.12); *C23C 24/04* (2013.01)

(58) Field of Classification Search
None
See application file for complete search history.

(56) References Cited

U.S. PATENT DOCUMENTS

| | | | | |
|---|---|---|---|---|
| 6,087,023 | A | * | 7/2000 | Tsantrizos ............... C23C 4/185 |
| | | | | 428/668 |
| 10,697,076 | B2 | | 6/2020 | Millward et al. |
| 10,900,136 | B2 | | 1/2021 | Li et al. |
| 10,948,108 | B2 | * | 3/2021 | Yang ........................ B22F 5/106 |
| 11,479,861 | B2 | | 10/2022 | Roberge et al. |
| 2013/0236323 | A1 | * | 9/2013 | Mironets ................. C23C 24/04 |
| | | | | 29/889 |
| 2014/0093384 | A1 | | 4/2014 | Mironets et al. |
| 2017/0291260 | A1 | * | 10/2017 | McCarren ............ B29C 64/241 |
| 2019/0234697 | A1 | * | 8/2019 | Chipko ...................... F28F 1/04 |
| 2019/0301035 | A1 | * | 10/2019 | Millward ................... F02C 9/18 |
| 2020/0247056 | A1 | | 8/2020 | Binek et al. |
| 2022/0354632 | A1 | * | 11/2022 | Reiterer ............... C12N 5/0663 |
| 2023/0249254 | A1 | * | 8/2023 | Allen ...................... B22F 10/25 |

FOREIGN PATENT DOCUMENTS

| | | | | |
|---|---|---|---|---|
| WO | WO-0020146 | A1 | * | 4/2000 ............. B22F 3/115 |
| WO | 2024008897 | A2 | | 1/2024 |

* cited by examiner

*Primary Examiner* — Yung-Sheng M Tsui

(74) *Attorney, Agent, or Firm* — Kinney & Lange, P.A.

(57) ABSTRACT

A method of making a metallic component includes mounting a polymeric scaffold onto a mandrel, wherein the mandrel includes one or more chucks configured to secure the polymeric scaffold onto the mandrel and wherein the mandrel is configured to rotate the polymeric scaffold; depositing, with a second additive manufacturing (AM) technique using a material applicator, a component material onto the polymeric scaffold to form the metallic component on the polymeric scaffold, wherein the component has a shape that is the same as the polymeric scaffold; removing the polymeric scaffold; and the metallic component deposited on the polymeric scaffold from the mandrel; and removing the polymeric scaffold from the metallic component.

12 Claims, 3 Drawing Sheets

MULTIPLE ADDITIVE MANUFACTURING TECHNIQUE MATERIAL DEPOSITION

The present disclosure relates generally to a gas turbine engine combustor and, more particularly, a gas turbine engine combustor with features that are suitable for construction using additive manufacturing techniques.

Using a single additive manufacturing technique to build certain geometries can be limited due to challenges with the additive manufacturing techniques. For example, building large monolithic parts build using powder bed fusion additive manufacturing techniques can result in a considerable amount of internal stress that produces cracking or damage to the build plate. In other examples, building tall thin parts, such as gas turbine engine combustors, can be challenged by distortion and possible recoater interaction.

SUMMARY

One aspect of this disclosure is directed to a method of making a metallic component including mounting a polymeric scaffold onto a mandrel, wherein the mandrel includes one or more chucks configured to secure the polymeric scaffold onto the mandrel and wherein the mandrel is configured to rotate the polymeric scaffold; depositing, with a second additive manufacturing (AM) technique using a material applicator, a component material onto the polymeric scaffold to form the metallic component on the polymeric scaffold, wherein the component has a shape that is the same as the polymeric scaffold; removing the polymeric scaffold; and the metallic component deposited on the polymeric scaffold from the mandrel; and removing the polymeric scaffold from the metallic component.

Another aspect of this disclosure is directed to a metallic component made using the above method.

DETAILED DESCRIPTION

Small gas turbine engines are useful for a number of applications for which small size, high altitude relight capability, improved operability and lean blow out characteristics, and good operational life are desirable. In addition, it is often desirable that significant portions of such gas turbine engines can be made using additive manufacturing processes. While combustor liners for such gas turbine engines are frequently made from nickel-based superalloys, there are advantages to making such combustor liners from copper or copper alloys. Copper and copper alloys, however, can be difficult to print using powder bed fusion (PBF) additive manufacturing (AM) techniques. The multiple additive manufacturing technique material deposition method of this disclosure uses a combination of AM techniques that are more compatible with copper and copper alloys to be able to build large monolithic parts and tall thin-walled structures such as gas turbine engine combustor liners.

Figure 1:
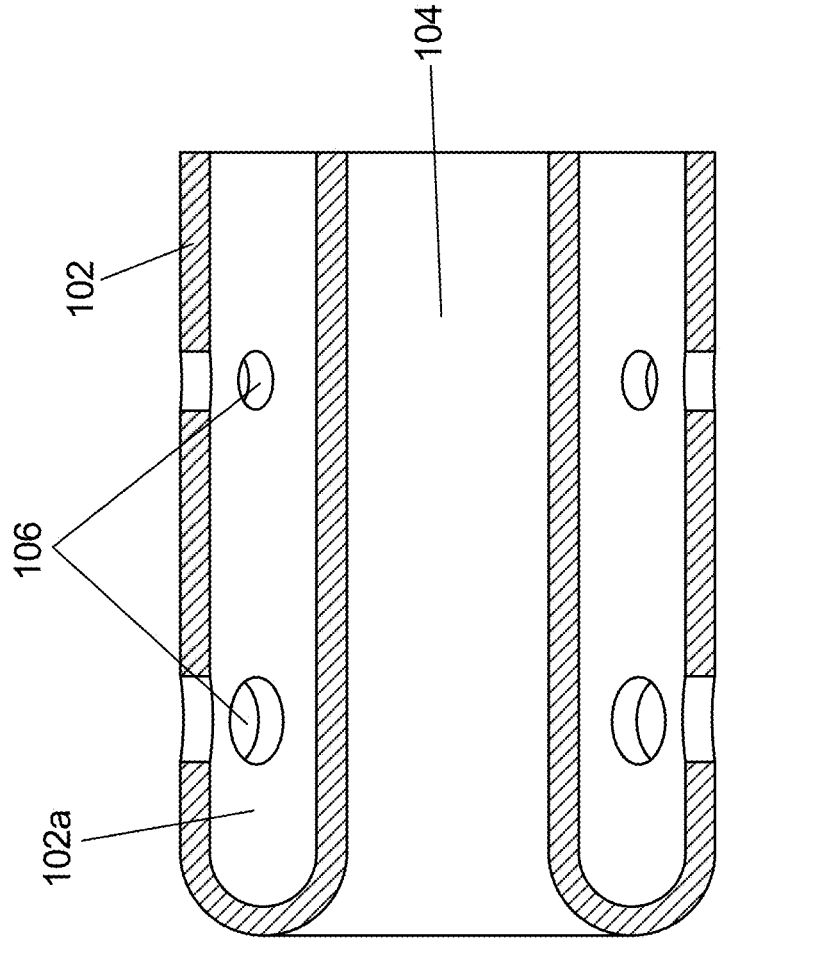
FIG. 1 is a view of polymeric scaffold of the present disclosure.

FIG. 1 shows a polymeric scaffold 102 that can be the foundation for building a metallic component 114 (see FIGS. 3A and 3B), which can be a gas turbine engine combustor liner or another component. The polymeric scaffold 102 should have a shape consistent with the desired metallic component 114. In the example of FIG. 1, the polymeric scaffold 102 includes an inner bore 104, which can, for example, become a combustion chamber of a combustor liner. Depending on the requirements of a particular application, the polymeric scaffold 102 can include one or more apertures 106 that can facilitate operation of the part that the metallic component 114 will become when finished and an inner portion 102a that facilitates the selected AM processes.

The polymeric scaffold 102 can be made from any appropriate manufacturing technique, including molding, casting, an AM technique or any other manufacturing technique deemed appropriate for a particular application. In one example, the polymeric scaffold 102 can be made using a material extrusion (MEX) AM technique using process parameters deemed appropriate for a particular application. The apertures 106 can be formed directly in the polymeric scaffold 112, avoiding the need for a post-processing step to drill the apertures 106, or the apertures 106 can be formed by any other method, including a post-processing step. The shape, dimensions, mechanical properties, and material composition of the polymeric scaffold 102 should be selected to be appropriate for the selected application. Depending on the selected application, the polymeric scaffold 102 can be made from a thermoplastic material such as acrylonitrile-butadiene-styrene copolymers (ABS), polylactide (PLA), polycarbonate (PC) and polyamides (PA), polyetheretherketone (PEEK), polytetrafluoroethylene and other thermoplastic materials. In other applications, the polymeric scaffold 102 can be made from a thermoset material such as bismaleimide (BMI) and other thermoset materials.

Figures 2A, 2B:
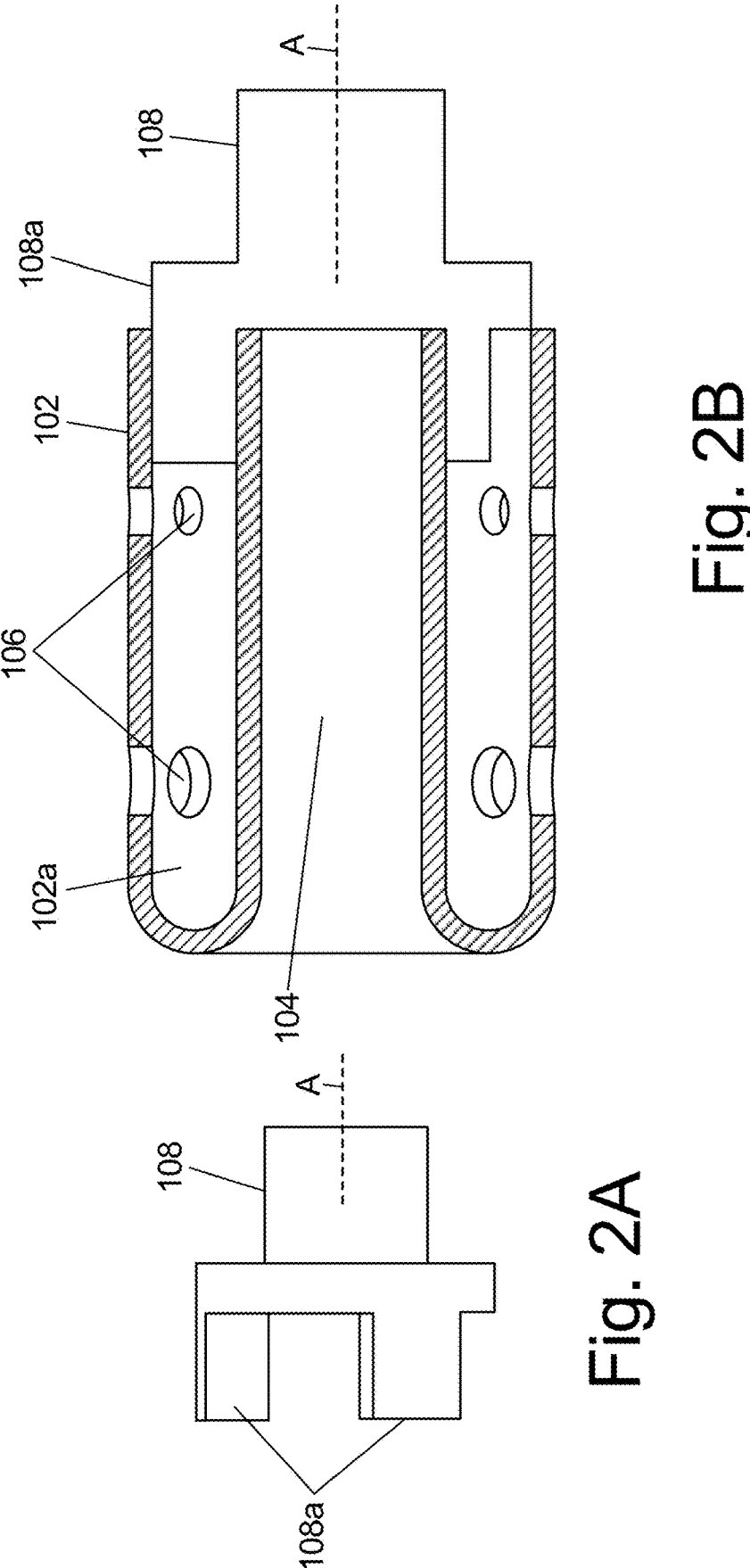
FIG. 2A is mandrel useful in the manufacturing technique of the present disclosure.
FIG. 2B is view of the polymeric scaffold of FIG. 1 mounted on the mandrel of FIG. 2A.
Figure 3B:
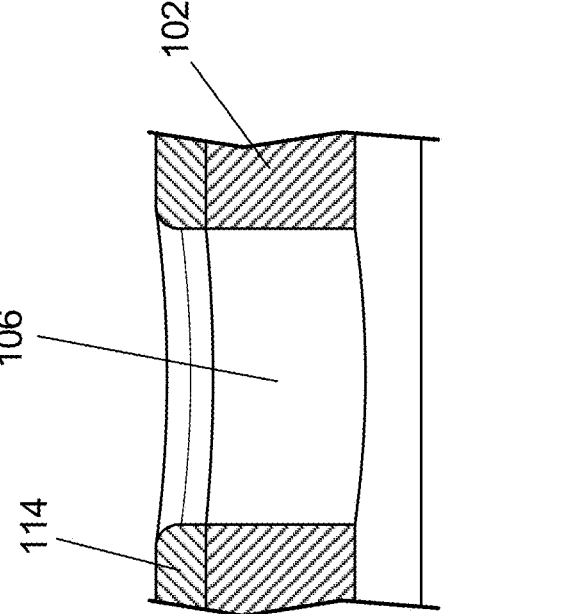
FIG. 3B is a focused view of an aperture of the component of FIG. 3A as deposited on the polymeric scaffold.
Figure 3A:
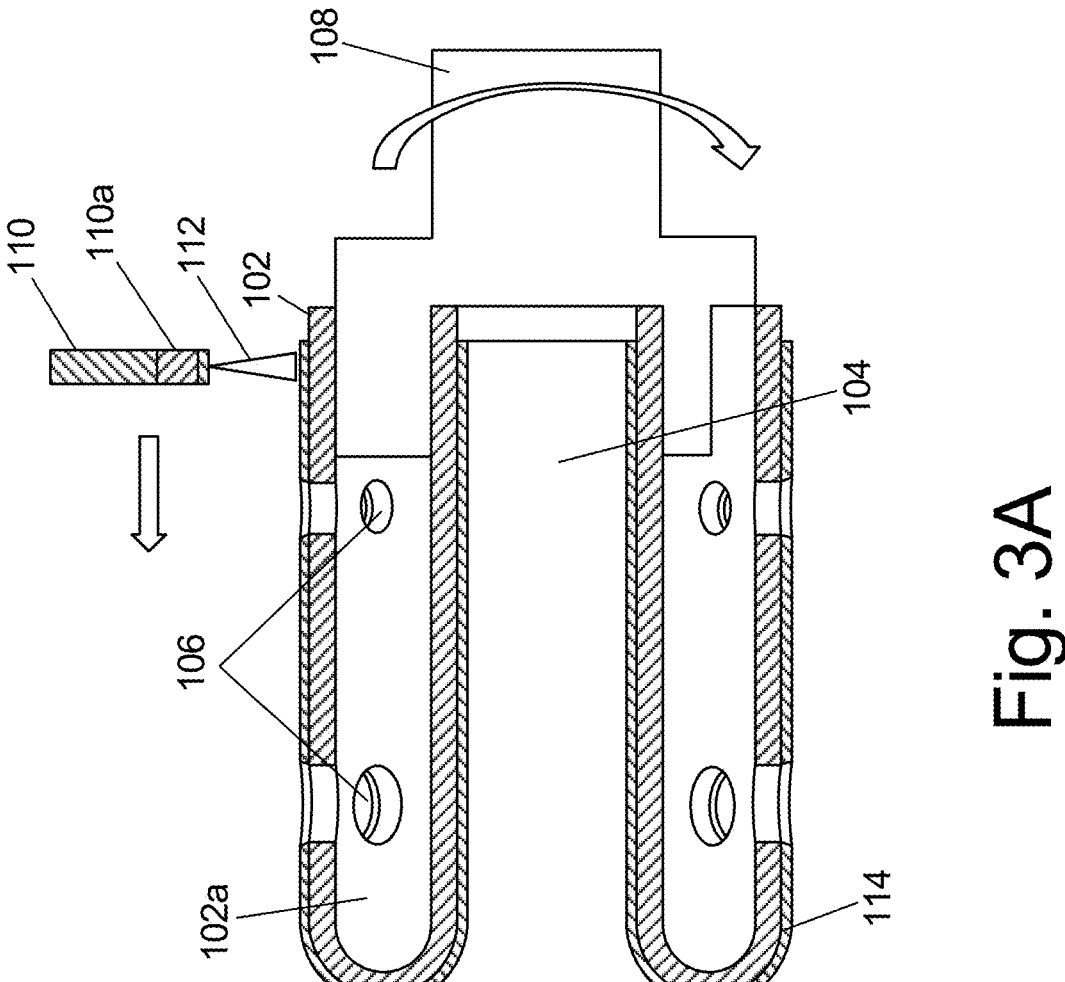
FIG. 3A is a schematic view of a component being built on the polymeric scaffold of FIG. 2B while the mandrel rotates.

FIG. 2A shows a mandrel 108, including chucks 108a that can engage with the polymeric scaffold 102 to secure the polymeric scaffold 102 to the mandrel 108 and permit the polymeric scaffold 102 with the mandrel 108 to rotate around an axis A (see FIG. 2B). Any suitable tooling and fixturing (not shown) can be used to cause the polymeric scaffold 102 and the mandrel 108 to rotate around the axis A. As shown in FIG. 3A, as the mandrel 108 rotates, the material applicator 110 deposits a component material 112 onto the spinning polymeric scaffold 102 to form the metallic component 114 on the polymeric scaffold 102. The polymeric scaffold 102 can include an over-spray region so excess component material 112 does not impact the mandrel 108.

The component material 112 should be selected to be appropriate for the intended us of the metallic component 114 formed through method of this disclosure. For example, if the metallic component 114 will be used as a gas turbine engine combustor liner, the component material can be a nickel-based superalloy, copper, or a copper alloy such as GRCop-84 (Cu-8Cr-4Nb) (at %), GRCop-42 (Cu-4Cr-2Nb) (at %) and similar copper-based alloys or any other material deemed suitable for the application.

The AM technique for component material 112 deposition should be selected for compatibility with the component material 112 and the desired post-build properties of the metallic component 114. For example, in some examples, the AM technique for depositing the component material 112 can be directed energy deposition (DED), cold spray, or another AM technique.

Cold spray can be a desirable a AM technique to deposit the component material 112 on the polymeric scaffold 102 discussed above due to the relatively low temperature at which cold spray operates. As known, cold spray techniques use a pressurized carrier gas (e.g., nitrogen or other appropriate gas) to accelerate component material 112 particles through a supersonic nozzle and toward a targeted surface (i.e., the polymeric scaffold 102). The component material 112 particles are mixed and sprayed at a temperature that is well below their melting point and the particles are near ambient temperature of the deposition chamber when they impinge the targeted surface. Kinetic energy, rather than high particle temperature, causes the particles to deform plastically when they impinge on the targeted surface, which in turn causes the particles to form a bond with the targeted surface. Bonding to the component surface occurs as a solid state process with insufficient thermal energy to transition the solid powders to molten droplets. As a result, cold spray techniques can produce a coating that strengthens the component using a variety of materials that may not be easily applied using techniques that expose the materials to high temperatures.

When using a cold spray AM technique, the a material applicator 110 sprays the component material 112 onto the polymeric scaffold 102 as the polymeric scaffold 102 turns with the mandrel 118 without causing the polymeric scaffold 102 to melt or deform. The material applicator 110 is configured to traverse linearly along the length of the polymeric scaffold 102 so that all surfaces of the polymeric scaffold 102 are coated with the component material 112, forming the metallic component 114. The material applicator 110 can be further configured with a moveable spray head 110a that can bend at least 90° (or more) to coat the inner bore 104 of the polymeric scaffold 102 with the component material 112, completing all portions of the metallic component 114. As the material applicator 110 moves over apertures 106 in the polymeric scaffold 102, the component material 112 passes through the apertures 106 into an inner portion 102a of the polymeric scaffold 102. As shown in FIG. 3B, the cold spray AM technique may result in rounded edges around the apertures 106 that can support a desired pressure drop across the apertures 106. The material applicator 110 traverse speed and mandrel 118 rotation speed should be selected to be appropriate to deposit the component material 112 to the desired density and thickness to form the metallic component 114. As a result, the metallic component 114 is formed with the desired shape as a shell on top of the polymeric scaffold 102.

After the cold spray AM step is completed, the mandrel 108 is removed from the polymeric scaffold 102 and the polymeric scaffold 102 can be chemically or thermally removed from the metallic component 114, leaving a nearly finished part, such as a gas turbine engine combustor liner. Chemical removal can be performed using any appropriate reagent that can dissolve or break up the polymeric scaffold 102 to remove the polymeric scaffold 102 from the metallic component 114. Thermal removal can be performed by heating the polymeric scaffold 102 to a temperature above the melting point of the material from which the polymeric scaffold 102 is made and/or heating the polymeric scaffold 102 in an oxidizing atmosphere to a temperature at which the polymeric scaffold 102 will oxidize.

The disclosed method can be useful for making copper or copper alloy combustion liners because copper and copper alloys are challenging to print using PBF AM techniques due to the material and the structure is cost-prohibitive. Further the disclosed method can form metallic components 114 rapidly and without the need for significant post processing, particularly thermal post processing (i.e., hot isostatic pressing [HIP]) because the component material 112 can be deposited with a density appropriate for many desired applications.

DISCUSSION OF POSSIBLE EMBODIMENTS

The following are non-exclusive descriptions of possible embodiments of the present invention.

A method of making a metallic component including mounting a polymeric scaffold onto a mandrel, wherein the mandrel includes one or more chucks configured to secure the polymeric scaffold onto the mandrel and wherein the mandrel is configured to rotate the polymeric scaffold; depositing, with a second additive manufacturing (AM) technique using a material applicator, a component material onto the polymeric scaffold to form the metallic component on the polymeric scaffold, wherein the component has a shape that is the same as the polymeric scaffold; removing the polymeric scaffold; and the metallic component deposited on the polymeric scaffold from the mandrel; and removing the polymeric scaffold from the metallic component.

The method of the preceding paragraph can optionally include, additionally and/or alternatively, any one or more of the following features, configurations and/or additional elements:

The method further comprising the step of building, using a first AM technique, the polymeric scaffold.

The first AM technique is material extrusion (MEX).

The polymeric scaffold is formed in the shape of a gas turbine engine combustor liner.

The polymeric scaffold includes one or more apertures.

The second AM technique is cold spray and the component material is copper or a copper alloy.

The polymeric scaffold includes an inner bore configured to define a combustion chamber of the combustor liner when the component material is deposited onto the polymeric scaffold.

The material applicator includes a moveable spray head that is configured to bend at least 90° to permit the component material to be deposited onto the inner bore of the polymer scaffold.

The mandrel is removed from the polymeric scaffold after the metallic component is formed on the polymeric scaffold.

The polymeric scaffold is removed from the metallic component after the mandrel is removed from the polymeric scaffold.

The polymeric scaffold is removed from the metallic component using a chemical reagent.

The polymeric scaffold is removed from the metallic component using a thermal removal process.

A metallic component made using the above methods.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a metallic component, comprising the steps of:

mounting a polymeric scaffold onto a mandrel, wherein the mandrel includes one or more chucks configured to secure the polymeric scaffold onto the mandrel and wherein the mandrel is configured to rotate the polymeric scaffold;

depositing, with a second additive manufacturing (AM) technique using a material applicator, a component material onto the polymeric scaffold to form the metallic component on the polymeric scaffold, wherein the component has a shape that is the same as the polymeric scaffold;

removing the polymeric scaffold and the metallic component deposited on the polymeric scaffold from the mandrel; and removing the polymeric scaffold from the metallic component.

2. The method of claim 1, further comprising the step of:
building, using a first AM technique, the polymeric scaffold.

3. The method of claim 2, wherein the first AM technique is material extrusion (MEX).

4. The method of claim 1, wherein the polymeric scaffold is formed in the shape of a gas turbine engine combustor liner.

5. The method of claim 4, wherein the polymeric scaffold includes one or more apertures.

6. The method of claim 4, wherein the second AM technique is cold spray and the component material is copper or a copper alloy.

7. The method of claim 6, wherein the polymeric scaffold includes an inner bore configured to define a combustion chamber of the combustor liner when the component material is deposited onto the polymeric scaffold.

8. The method of claim 7, wherein the material applicator includes a moveable spray head that is configured to bend at least 90° to permit the component material to be deposited onto the inner bore of the polymer scaffold.

9. The method of claim 1, wherein the mandrel is removed from the polymeric scaffold after the metallic component is formed on the polymeric scaffold.

10. The method of claim 9, wherein the polymeric scaffold is removed from the metallic component after the mandrel is removed from the polymeric scaffold.

11. The method of claim 10, wherein the polymeric scaffold is removed from the metallic component using a chemical reagent.

12. The method of claim 10, wherein the polymeric scaffold is removed from the metallic component using a thermal removal process.

\* \* \* \* \*